United States Patent [19]

Perry

[11] Patent Number: 5,050,092
[45] Date of Patent: Sep. 17, 1991

[54] FAN EFFICIENCY MEASURING APPARATUS

[76] Inventor: Robert E. Perry, 1348 Starcross Dr., Birmingham, Ala. 35216

[21] Appl. No.: 484,246

[22] Filed: Feb. 26, 1990

[51] Int. Cl.$^5$ .......................................... G01M 19/00
[52] U.S. Cl. ............................... 364/506; 364/551.01; 73/168
[58] Field of Search .......................... 364/506, 551.01; 73/168

[56] References Cited

U.S. PATENT DOCUMENTS

| | | | |
|---|---|---|---|
| 3,350,934 | 11/1967 | Orkney, Jr. et al. | 73/168 |
| 4,325,223 | 4/1982 | Cantley | 364/551.01 X |
| 4,766,553 | 8/1988 | Kaya et al. | 364/506 |
| 4,781,064 | 11/1988 | Yates | 73/168 |
| 4,905,511 | 3/1990 | Reinhold | 73/168 |

*Primary Examiner*—Parshotam S. Lall
*Assistant Examiner*—S. A. Melnick
*Attorney, Agent, or Firm*—Jennings, Carter, Thompson & Veal

[57] ABSTRACT

A fan efficiency monitoring system and method utilizes the measured temperature and pressure differential a fan to calculate and display fan efficiency relative to the temperature differential in an isentropic process at the same inlet temperature and pressure differential. The computed fan efficiency is displayed proximal the fan or at a remote operator's station.

8 Claims, 2 Drawing Sheets

FAN EFFICIENCY MEASURING APPARATUS

BACKGROUND OF THE INVENTION

The present invention relates to the use of fans in industrial applications such as exhaust fans and fans associated with various industrial processes. The invention further relates to the measurement of operational fan efficiency and more particularly to the measurement and display of fan efficiency independent of flow rate measurement or of input shaft horsepower.

The measurement of pressure differential has at various times been used to calculate flow rate through fans and the use of brake horsepower, shaft input horsepower and static pressures to evaluate fan performance have been documented. Nonetheless, there exists a need for a simple portable or fixed unit which can measure selected parameters on a substantially instantaneous and incremental basis to determine and display fan efficiency without in any way affecting the fan performance and without requiring knowledge of the specific fan input horsepower or other mechanical characteristics.

SUMMARY OF THE INVENTION

It is the object of the present invention to provide a method and apparatus which will allow personnel to monitor fan efficiency in an industrial setting without interacting directly with the fan.

More particularly it is the object of the present invention to provide an apparatus that will indicate to personnel the efficiency of a selected fan in a system independently of the flow rate and the input horsepower.

The pressure rise of a gas as it is induced through a fan causes a slight differential in gas density and a subsequent increase in gas temperature. From the principles of thermodynamics, it is known that the temperature rise can be computed for an isentropic process, i.e. a process corresponding to 100% efficiency and free of internal losses. In actuality the process is not isentropic and internal losses do occur. Thus to determine fan efficiency it is necessary to determine the static pressure differential across the fan and temperature inlet and outlet readings and use these measurements to determine fan efficiency as a ratio based on the input temperature, pressure differential and temperature differential.

BRIEF DESCRIPTION OF THE DRAWINGS

Apparatus embodying features of my invention and used in my method are depicted in the accompanying drawings which form a portion of this disclosure, and wherein.

DESCRIPTION OF A PREFERRED EMBODIMENT

Figure 1:
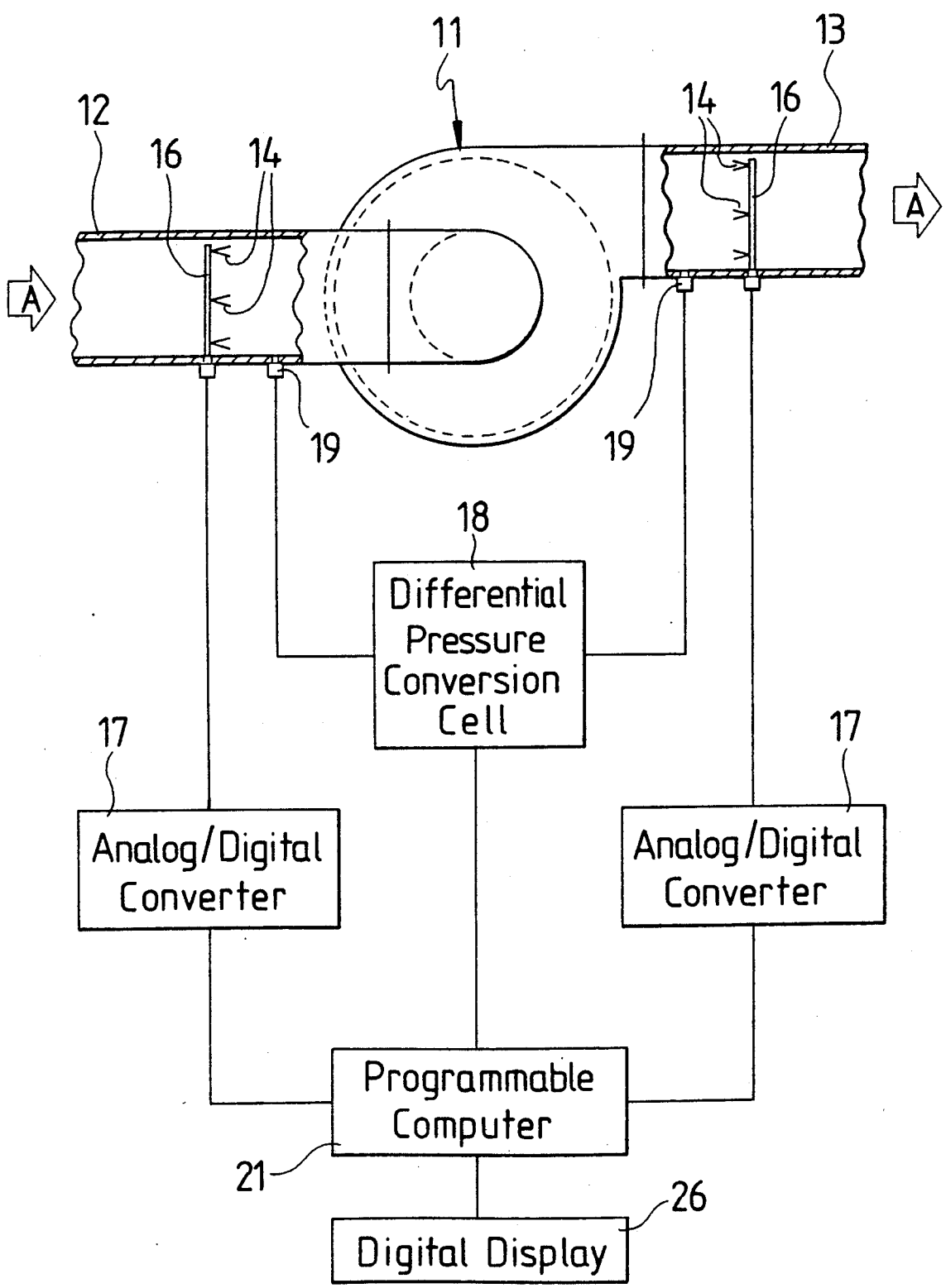
FIG. 1 is a schematic block diagram of the major components of the invention.

Referring to the drawings for a clearer understanding of the invention it may be seen that in FIG. 1, that I depict a fan 11 in a system including air handling ducts 12 and 13 through which the air or gas is urged by the fan. The arrow A depicts the direction of air flow through the system. Duct 12 is the fan inlet and has mounted therein a plurality of temperature sensing devices 14, such as thermocouples, which generate an analog electrical signal in accordance with the temperature sensed. As will be understood the size of the ductwork will affect the number of thermocouples used, however it should be noted that a minimum of six thermocouples should be located at the inlet and at the outlet of the fan 11. The thermocouples 14 should be mounted on rigid support brackets 16 to support the thermocouples inside the ducts and to isolate the thermocouples 14 from the duct as much as possible.

The analog electrical output of each thermocouple is converted to a digital electrical signal in an associated analog to digital converter 17 and output of these converters are averaged to yield a signal indicative of the average inlet temperature, $T_1$, and a signal indicative of the average outlet temperature, $T_2$. Such averaging may be accomplished externally of the ductwork at a designated monitoring station having an appropriate digital summing network therein or may be done in a programmable computer. In the former manner the computer can be programmed to iteratively sample the average output of the summing network to obtain the $T_1$ and $T_2$ values. In the alternative the computer may compute $T_1$ and $T_2$ from plural signals coincidentally acquired from sample and hold registers associated with each A/D convertor, which are well known and are not shown in the interest of clarity.

Pressure differential across the fan is measured by a conventional static pressure differential apparatus 18 which is well known and a plurality of standard pressure taps 19 mounted on the sidewalls of ducts 12 and 13 on either side of the fan 11. Again a digital electrical signal representative of the pressure differential ($P_2 - P_1$) in inches water gauge is output to the computer. Also $P_1$ is provided to the computer.

The computer shown diagrammatically at 21 may be any suitable microprocessor based computer programmed to calculate the efficiency of the fan 11 using the formula.

$$\text{Fan efficiency} = \frac{T_1 [(K-1)/K][(P_2 - P_1)/P_1]}{(T_2 - T_1)}$$

wherein:

$T_1$ = the inlet temperature in degrees Fahrenheit plus 460°

$T_2$ = the outlet temperature in degrees Fahrenheit plus 460°

$P_1$ = the inlet static pressure in inches water gauge plus 406.9 inches $P_2$ = the outlet static pressure in inches water gauge plus 406.9 inches $K$ = the ratio of gas specific heat at constant pressure to constant volume.

$T_2 - T_1$ represents the measured temperature differential of the gas induced through the fan, while $T_1[(K-1)/K][(P_2 - P_1)/P_1]$ represents the temperature differential if the process were isentropic or 100% efficient. The ratio of specific heats, $K$, has a constant value of about 1.67 for gases, 1.4 for diatomic gases, and values which approach unity for polyatomic gases. Thus with knowledge of the gas being forced through the system the computer 21 is readily programmed to compute efficiency.

Figure 2:
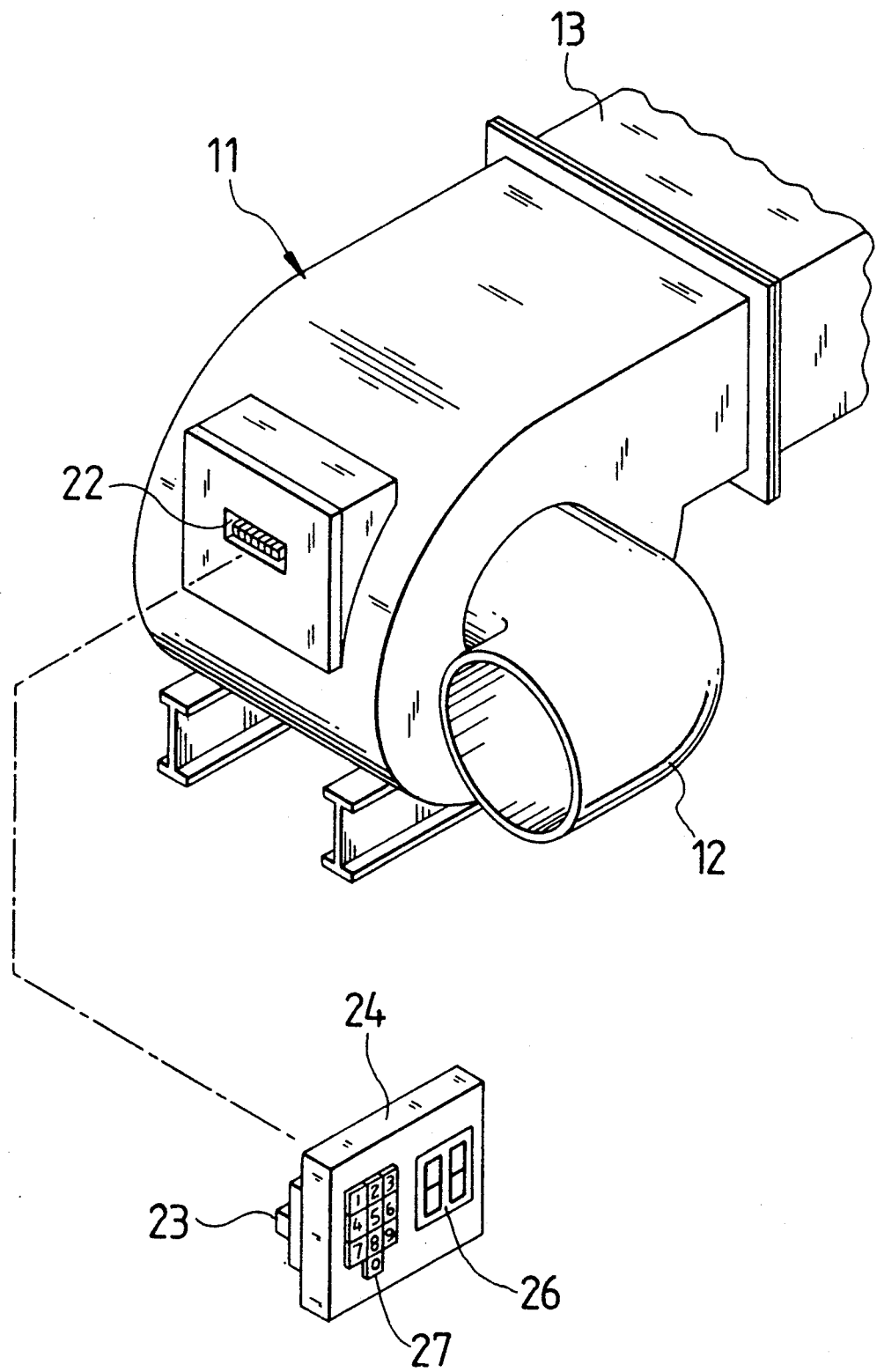
FIG. 2 is a pictorial illustration of the detachable computer display.

In one embodiment the computer 21 is fixed such as at a remote operator station and may be configured to receive temperature and pressure data signals from any of a number of fans in a system. In yet another embodiment, each fan would have an associated receptacle 22 proximal thereto into which a data probe 23, such as shown in FIG. 2 may be inserted to complete an electrical circuit between the sensory devices 14 and 17 and the computer 21 which would be enclosed in a portable display unit 24, which include a digital display 26 operably connected to computer 21 to display the efficiency computed and a keypad 27 which can be used by the operator to input data, such as the number of thermocouples to be averaged or the value of K for the particular type gas in the system.

From the foregoing it may be seen that the invention does not require the measurement of flow rate, shaft horsepower, or the extraction of a sample gas for processing in an external device. Only the inlet and outlet temperature and fan differential fan readings are required for the computation if fan efficiency by computer 21. Thus using the present invention for efficiency may be rapidly and easily measured without disruption or impairment of the fan operation in any manner.

While I have shown my invention in various forms, it will be obvious to those skilled in the art that it is not so limited but is susceptible of various changes and modifications without departing from the spirit thereof.

I claim:

1. Apparatus for monitoring the efficiency of a fan in an air conduit comprising:
    (a) first means for sensing average air temperature within an air conduit on the discharge side of a driven fan comprising a plurality of thermocouples spaced apart within said air conduit;
    (b) second means for sensing average air temperature within an air conduit on an inlet side of said fan comprising a plurality of thermocouples spaced apart within said air conduit;
    (c) means for sensing the air pressure differential from the inlet of said fan and the discharge of said fan; and
    (d) means operatively connected to said first and second temperature sensing means and said pressure sensing means to receive signals derived from the parameter sensed thereby for converting said signals into a fan efficiency ratio based on the formula $$\text{Fan efficiency} = \frac{T_1[(K-1)/K][(P_2-P_1)/P_1]}{T_2 - T_1}$$

wherein:
    $T_1$ = fan discharge temperature in degrees Fahrenheit plus 460°,
    $T_2$ = fan inlet temperature in degrees Fahrenheit plus 460°,
    $P_2$ = fan discharge pressure in inches water gauge plus 406.9 inches,
    $P_1$ = fan inlet pressure in inches water gauge plus 406.9 inches,
    $K$ = ratio of gas specific heat at constant pressure to constant volume; and
    (e) means for displaying said fan efficiency.

2. Apparatus as defined in claim 1 wherein said means for converting comprises a programmable computer programmed to receive said signals and respectively calculate the fan efficiency based thereon and output a signal indicative thereof to said display means.

3. Apparatus as defined in claim 1 further comprising analog to digital conversion means associated with said thermocouples for converting the output of each thermocouple into a signal indicative of the temperature sensed thereby.

4. Apparatus as defined in claim 3 wherein said differential pressure sensing means comprising pressure transducer mounted upstream and downstream of said fan and means for converting the output of said transducer into a pressure differential signal.

5. Apparatus as defined in claim 4 wherein said means for converting comprises a programmable computer programmed to receive said signals and respectively calculate the fan efficiency based therein and output a signal indicative thereof to said display means.

6. Apparatus as defined in claim 5 wherein said display means is a visible digital display.

7. Apparatus as defined in claim 3 wherein said means for converting comprises a programmable computer programmed to receive said signals and respectively calculate the fan efficiency based therein and output a signal indicative thereof to said display means.

8. Apparatus as defined in claim 1 wherein said differential pressure sensing means comprising pressure transducer mounted upstream and downstream of said fan and means for converting the output of said transducer into a pressure differentials signal.

* * * * *